United States Patent [19]

Van Maaren

[11] Patent Number: 5,177,390
[45] Date of Patent: Jan. 5, 1993

[54] ROTOR

[75] Inventor: Richard D. Van Maaren, Sheboygan, Wis.

[73] Assignee: Kohler Co., Kohler, Wis.

[21] Appl. No.: 761,107

[22] Filed: Sep. 17, 1991

[51] Int. Cl.$^5$ .............................................. H02K 3/20
[52] U.S. Cl. ..................................... 310/183; 310/91; 310/197; 310/269
[58] Field of Search ............... 310/269, 183, 197, 261, 310/42, 62, 91, 63, 182, 211; 29/598

[56] References Cited

U.S. PATENT DOCUMENTS

| | | | |
|---|---|---|---|
| 3,521,098 | 7/1970 | Jesse | 310/211 |
| 3,590,301 | 6/1971 | Woydt | 310/269 |
| 3,612,930 | 10/1971 | Raby | 310/269 |
| 3,793,546 | 2/1974 | King, Jr. | 310/183 |
| 3,870,912 | 3/1975 | Kipke | 310/183 |
| 3,898,491 | 8/1975 | Long | 310/183 |
| 4,250,424 | 2/1981 | Sento | 310/261 |
| 4,293,787 | 10/1981 | Ito et al. | 310/181 |
| 4,316,111 | 2/1982 | Merki | 310/269 |
| 4,329,609 | 5/1982 | Allegre | 310/183 |
| 4,453,101 | 6/1984 | Nelson | 310/197 |
| 4,506,181 | 3/1985 | Jones et al. | 310/156 |
| 4,631,435 | 12/1986 | McCarty | 310/156 |
| 4,937,486 | 6/1990 | Schwanda | 310/269 |

FOREIGN PATENT DOCUMENTS 628588 10/1978 U.S.S.R. .

Primary Examiner—R. Skudy
Attorney, Agent, or Firm—Quarles & Brady

[57] ABSTRACT

A rotor for use in a generator or a motor wherein damper bars extend through rotor laminations and at least one of the damper bars extends from the laminations to provide support for a coil portion. In a preferred manner the damper bar extends from opposing ends of the laminations.

7 Claims, 1 Drawing Sheet

ROTOR

BACKGROUND OF THE INVENTION

The field of the invention is rotors for generators or motors, and particularly, rotors having damper bars which provide support for the coil portion.

In the manufacture of electrical rotors, it is common practice to employ steel bars in a rotor for the purpose of supporting the end turns of a rotor coil. Considerable cost savings could be effected in the manufacture of these rotors if the coil support members are replaced with the damper bars and still provide for coil support.

While damping conductors are shown in U.S. Pat. No. 4,506,181 as extending beyond rotor laminations, the prior art is devoid of teaching their use in supporting a wound coil. The space between the end ring and the laminations in U.S. Pat. No. 4,506,181 functions as a centrifugal fan. However, the damping bars do not extend beyond the main rotor body for improved circulation of cooling air. Neither does the rotor assembly described in this patent offer the improved flux density at the end turn regions.

SUMMARY OF THE INVENTION

The present invention relates to a rotor for use in a generator or a motor wherein there are rotor laminations including a coil portion. A rotor shaft is connected to the rotor laminations and damper bars extend through the rotor laminations. At least one of damper bars extends from the laminations to provide support for the coil portion. In a preferred manner, the damper bar extending from the laminations is of a geometric configuration different from the other damper bars and extends from opposing ends of the laminations. Also preferably the damper bar is composed of an aluminum or copper material.

A general object of the invention is to provide an improved rotor for use in a dynamoelectric machine such as a generator or motor.

An object of the invention is to provide a rotor of the foregoing kind which can be produced at a lower cost than those presently available.

Yet another object of the invention is to provide a rotor of the foregoing type which has improved cooling capabilities.

Still another object of the invention is to provide a rotor of the foregoing kind which has improved flux density at the end turn regions.

The foregoing and other objects and advantages of the invention will appear from the following description. In the description reference is made to the accompanying drawing which forms a part hereof, and in which there is shown by way of illustration a preferred embodiment of the invention. Such embodiment does not necessarily represent the full scope of the invention, however, and reference is therefore made to the claims herein for interpreting the scope of the invention.

DESCRIPTION OF THE PREFERRED EMBODIMENT

Figure 1:
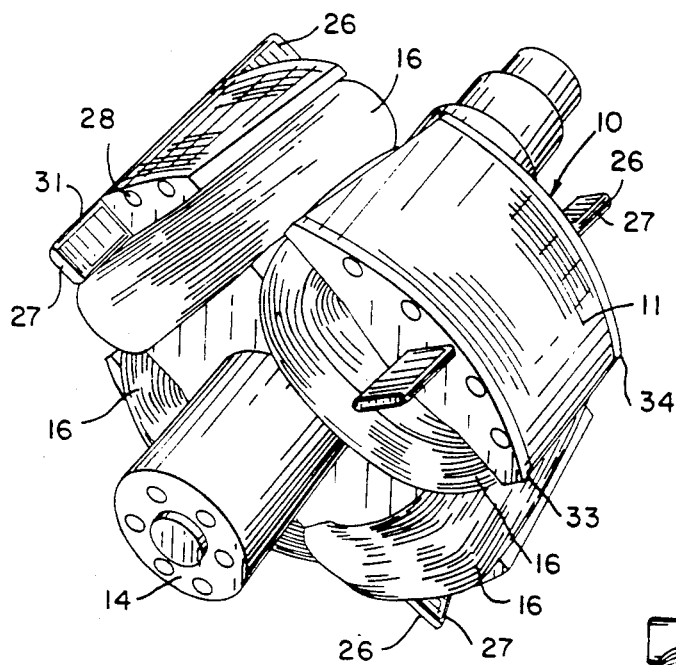
FIG. 1 is a lower perspective view of the rotor of the present invention.
Figure 2:
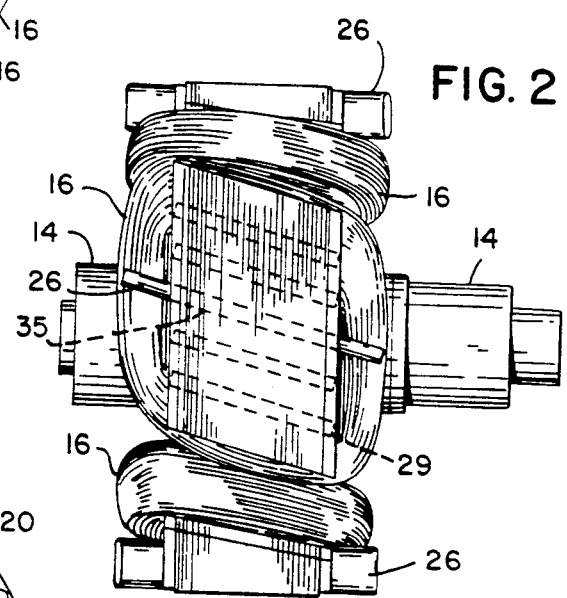
FIG. 2 is a side elevational view thereof.
Figure 3:
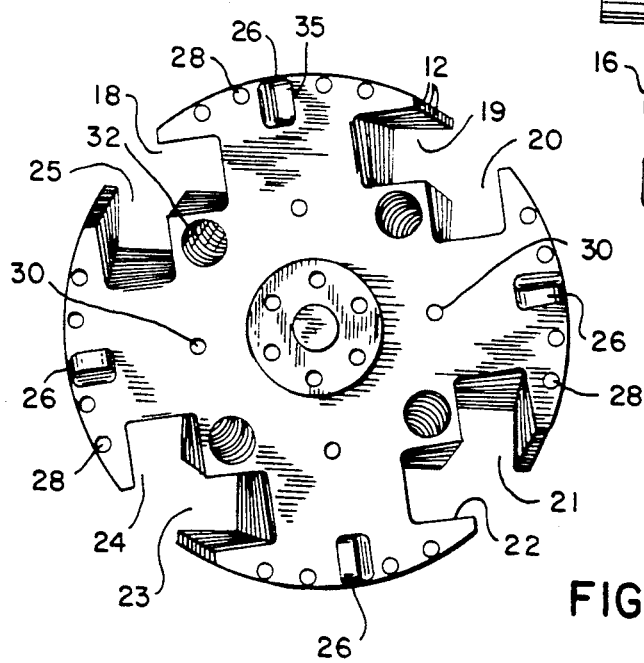
FIG. 3 is an end view showing the laminations secured to a shaft and without the coiled windings applied to the rotor.

Referring to FIGS. 1 and 3, the improved rotor generally 10 includes the usual lamination portion 11 which is composed of a plurality of stacked laminations 12. These are connected to the shaft 14 in the usual manner such as by a tongue and groove fitting. There are four windings or coils 16 disposed over the stacked laminations 12. These are wound in the usual cut outs 18-25 of the stacked laminations 12.

In order to support the windings 16 on the stacked laminations 11, there are positioned through suitable openings in the stacked laminations 12, the damper bars 26. It will be seen that these bars 26 are larger than the usual damper bars 29 which are placed in the holes 28. Alternatively, drive pins (not shown) can be placed through the stacked laminations 12 such as through holes 30 to support the coils 16 from the inner side. As seen in FIG. 3, there are cooling passages 32 extending through the stacked laminations 12.

An important aspect of the invention are the damper bars 26. These in effect take the place of rotor coil support pins which are an additional part placed into the rotor core and typically made of steel. Steel has the advantage of providing good strength but carries magnetic flux and adds to leakage flux in the end turn regions. The damper bars 26 are preferably made of aluminum or copper. As they do not have the strength of steel, they are shaped like a truss from bar stock for example as rectangular, or noncircular configurations such as oval or elliptical. In a preferred manner, the damper bars 26 have a longitudinal axis and a shorter transverse axis and when viewed in cross section along the transverse axis have parallel sides and rounded end portions. This configuration gives sufficient strength in a radial direction and the minimal cross section of the damper bar 26 in the radial direction minimizes magnetic flux restriction and maximizes air flow around the coil end windings 16 for cooling. The damper bars 26 are passed through the usual openings such as 35 in the laminations 12. The free ends or extending portions 27 of the damper bar 26 which extend from the lamination portion 11 are welded, brazed or otherwise electrically connected to damper plates or rings 33 and 34 which are positioned immediately adjacent the end or outer laminations in the usual manner along with the conventional welding or brazing of damper bars 29 to plate or rings 33 and 34. The free ends or extending portions 27 have an insulator such as a fiberglass sleeve 31 placed thereover to insulate it from the field winding.

In addition to eliminating support pins for the coils 16 as well as the cost for assembly, the damper bars 26 serve to act as a heat sink to the stacked laminations 12 and the coils 16 as well as act as a fan blade for improved heat transfer.

As indicated previously, the size and shape of the damper bars 26 can vary depending upon the particular application. The damper bars 26 may therefore take a corresponding number of sizes and shapes depending upon the particular applications. Further, while aluminum and copper have been indicated as the preferred materials for fabricating the damper bars 26, other metals could be used such as magnesium, steel or brass. Drive pins have been mentioned for use in conjunction with the damper bars 26. These could be eliminated and still obtain the previously stated advantages for the damper bars 26. Fiberglass is stated as a preferred material for insulating the exposed ends of the damper bars 26. If desired, other insulating materials such as plastic compositions could be substituted of which Nylon 6/6 polyamide material and thermoset silicons are representative. The laminations 12 are previously described as being connected to the shaft 14 by tongue and groove fitting. If desired, the securing method described in commonly assigned application Ser. No. 07/771,065 filed Oct. 2, 1991 could be employed.

I claim:

1. A rotor for use in dynamoelectric machine comprising:
   rotor laminations including a would coil portion;
   a rotor shaft connected to said rotor laminations; and
   damper bars extending through said rotor laminations, at least one of said damper bars composed of a high electrically conductive material and having free ends extending from said laminations to provide support for said coil portion.

2. The rotor of claim 1 wherein said one of said damper bars extending from said laminations is of a geometric configuration different from said damper bars extending through said rotor laminations.

3. The rotor of claim 1 wherein said one of said damper bars extending from said laminations extends from opposing ends of said lamination.

4. The rotor of claim 1 wherein said one of said damper bars extending from said laminations is noncircular.

5. The rotor of claim 1 wherein said one of said damper bars extending from said laminations has a longitudinal axis and a shorter transverse axis and when viewed in cross section along said transverse axis has parallel sides and rounded end portions.

6. The rotor of claim 4 wherein said one of said damper bars extending from said laminations is composed of an aluminum material.

7. The rotor of claim 4 wherein said one of said damper bars extending from said laminations is composed of a copper material.

* * * * *

UNITED STATES PATENT AND TRADEMARK OFFICE
CERTIFICATE OF CORRECTION

PATENT NO. : 5,177,390

DATED : January 5, 1993

INVENTOR(S) : Richard D. Van Maaren

It is certified that error appears in the above-identified patent and that said Letters Patent is hereby corrected as shown below:

Column 3:
Claim 1, line 3      before "coil" "would" should be --wound--.

Column 4:
Claim 3, line 3      after "said" "lamination" should be --laminations--.

Signed and Sealed this

Twenty-third Day of November, 1993

Attest:

BRUCE LEHMAN

Attesting Officer    *Commissioner of Patents and Trademarks*